(12) United States Patent
Taylor

(10) Patent No.: US 10,653,990 B2
(45) Date of Patent: May 19, 2020

(54) AIRFLOW CONTROLLER FOR DUCTING

(71) Applicant: AUTOMATIC AIR, LLC, Calexico, CA (US)

(72) Inventor: James Eric Taylor, El Centro, CA (US)

( * ) Notice: Subject to any disclaimer, the term of this patent is extended or adjusted under 35 U.S.C. 154(b) by 106 days.

(21) Appl. No.: 15/673,684

(22) Filed: Aug. 10, 2017

(65) Prior Publication Data

US 2018/0111078 A1   Apr. 26, 2018

Related U.S. Application Data

(63) Continuation-in-part of application No. 15/332,901, filed on Oct. 24, 2016, now Pat. No. 10,518,207.

(51) Int. Cl.
| | |
|---|---|
| *B01D 46/18* | (2006.01) |
| *B01D 46/46* | (2006.01) |
| *F24F 11/30* | (2018.01) |
| *F24F 11/39* | (2018.01) |
| *F24F 11/74* | (2018.01) |
| *F24F 11/77* | (2018.01) |
| *B01D 46/44* | (2006.01) |
| *B01D 46/00* | (2006.01) |
| *F24F 13/28* | (2006.01) |
| *F24F 110/30* | (2018.01) |

(52) U.S. Cl.
CPC ....... *B01D 46/444* (2013.01); *B01D 46/0045* (2013.01); *B01D 46/0086* (2013.01); *B01D 46/185* (2013.01); *F24F 11/30* (2018.01); *F24F 11/39* (2018.01); *F24F 11/74* (2018.01); *F24F 11/77* (2018.01); *F24F 13/28* (2013.01); *B01D 2279/35* (2013.01); *F24F 2110/30* (2018.01)

(58) Field of Classification Search
CPC ...... B01D 46/18; B01D 46/46; B01D 46/444; B01D 46/4227; B01D 2279/50; B01D 46/0086; B01D 46/185; B01D 46/0045; B01D 2279/35; F24F 11/30; F24F 11/39; F24F 11/74; F24F 11/77; F24F 23/28; F24F 2110/30
USPC ............. 55/351–354; 96/424, 425, 429; 73/863.51
See application file for complete search history.

(56) References Cited

U.S. PATENT DOCUMENTS

| | | | | |
|---|---|---|---|---|
| 2,782,612 A | * | 2/1957 | Spiegelhalter | ........ F24F 3/1603 55/354 |
| 3,175,775 A | * | 3/1965 | Wurtenberg | ........... B01D 46/18 242/534 |
| 3,286,443 A | * | 11/1966 | Wooldridge | ........... B01D 46/18 242/538.2 |
| 4,369,112 A | * | 1/1983 | Vincent | .................. B01D 29/39 210/321.84 |
| 4,470,833 A | * | 9/1984 | Wolfe | .................... B01D 46/46 335/205 |

(Continued)

*Primary Examiner* — Minh Chau T Pham
(74) *Attorney, Agent, or Firm* — Nydegger & Associates

(57) ABSTRACT

A control unit is provided for monitoring the efficacy of an air filter in the ducting of an operating HVAC system. Specifically, the control unit monitors airflow velocity in the ducting to evaluate and control the power requirements that are necessary for the HVAC system to maintain a constant airflow velocity in the ducting of the system. In accordance with the present invention, the power requirements are measured and evaluated during the duty cycle of an air filter, to thereby determine when the air filter needs to be removed or replaced.

17 Claims, 1 Drawing Sheet

(56) References Cited

U.S. PATENT DOCUMENTS

| | | | | |
|---|---|---|---|---|
| 4,494,406 | A * | 1/1985 | Komons | G01F 1/698 338/22 R |
| 4,611,470 | A * | 9/1986 | Enstrom | F25B 49/02 62/127 |
| 4,680,115 | A * | 7/1987 | LaValley | B01D 33/067 210/247 |
| 5,791,408 | A * | 8/1998 | Seem | F24F 11/70 165/250 |
| 6,066,194 | A * | 5/2000 | Hugghins | B03C 3/36 96/397 |
| 6,128,910 | A | 10/2000 | Faircloth | |
| 6,152,998 | A * | 11/2000 | Taylor | B01D 46/18 55/354 |
| 6,596,059 | B1 * | 7/2003 | Greist | B01D 46/18 55/351 |
| 6,632,269 | B1 * | 10/2003 | Najm | B01D 46/0023 55/351 |
| 7,516,649 | B2 | 4/2009 | Locke | |
| 8,404,030 | B2 * | 3/2013 | Schumacher | B01D 46/185 55/351 |
| 2007/0024229 | A1 * | 2/2007 | Caro | F24F 11/77 318/727 |
| 2010/0076606 | A1 * | 3/2010 | Gatley | F04D 27/004 700/276 |
| 2016/0281723 | A1 * | 9/2016 | Zhang | F04D 29/325 |
| 2017/0016642 | A1 * | 1/2017 | Spalink | F24F 11/30 |
| 2017/0074533 | A1 * | 3/2017 | Ji | G05B 6/02 |
| 2018/0031267 | A1 * | 2/2018 | Hern | F24F 11/30 |
| 2018/0154297 | A1 * | 6/2018 | Maletich | F24F 11/39 |

* cited by examiner

AIRFLOW CONTROLLER FOR DUCTING

This application is a continuation-in-part of application Ser. No. 15/332,901 filed Oct. 24, 2016, which is currently pending. The contents of application Ser. No. 15/332,901 are incorporated herein by reference.

FIELD OF THE INVENTION

The present invention pertains generally to control systems for monitoring the efficacy of an air filter in the ducting of a Heating-Ventilation-Air-Conditioning (HVAC) system. More particularly, the present invention pertains to control units which use airflow velocity measurements v to determine the power requirements P for an HVAC system that are needed to maintain an effective airflow in the ducting of the HVAC system. The present invention is particularly, but not exclusively, useful as a control unit which monitors airflow velocity in an air duct to evaluate the power requirements for an HVAC system that are necessary to maintain a constant airflow velocity during the duty cycle of an air filter, and to thereby determine when the air filter needs to be replaced.

BACKGROUND OF THE INVENTION

An air filter is an important component of an HVAC system for several reasons. For one, it acts to purify air in the environment at a site where the HVAC system is operating. For another, by removing dust and particulates from the air at a site, an air filter also contributes to the efficiency of the HVAC system. Over time, however, as dust and particulates accumulate and build up on the air filter, its efficacy is substantially diminished.

The effect of a dirty air filter in an HVAC system is essentially two-fold. Most noticeably, a dirty air filter restricts airflow through the ducting of an HVAC system. A consequence here is the reduction of airflow velocity in the air duct. Perhaps more importantly, however, in order to overcome the reduced airflow capability that is caused by a dirty air filter, the HVAC system must operate at higher power levels. The unwanted consequences of this are: 1) increased operational costs for the HVAC system, and 2) an increased possibility of a potentially unacceptable demand on the local power grid. Both are to be avoided.

As disclosed in U.S. Pat. No. 6,128,910 for an invention entitled "Diagnostic Unit for an Air Conditioning System", which is assigned to Enalasys Corporation, the operational efficacy of an HVAC system can be determined by measuring enthalpies at selected locations in the system. Further, in U.S. application Ser. No. 15/428,643, filed on Feb. 9, 2017, for an invention entitled "Site-Customized Benchmark for Operating an Air Conditioning System in Real Time", the operational efficacy of an HVAC system is based on enthalpy measurements that are responsive to environmental considerations at the site of the system. Suffice it to say here that, in both of these cases, enthalpy measurements are a function of the volume of air being measured. Accordingly, they are also a function of the velocity of airflow through an HVAC system. Thus, as recognized by the present invention, the overall efficiency of an HVAC system, and the efficacy of an air filter in the system are both related to a same airflow velocity v.

In addition to the considerations of enthalpy noted above, the present invention recognizes that decreases in air filter efficacy are a direct result of reductions to the velocity v of air flowing through the ducting of an HVAC system. Moreover, the present invention recognizes that in order to maintain the overall efficiency of an HVAC system, detrimental reductions in airflow velocity v need to be countered by increasing the operational power requirements for the HVAC system. Increased operational power requirements, however, have a practical limit. In any event, airflow velocity v is an important consideration.

It is well known that airflow velocities v can be measured by a pitot-static tube. In overview, a pitot-static tube functions on the principle that in any airflow, a total pressure=static pressure+dynamic pressure. In this relationship, the dynamic pressure=$\frac{1}{2}\rho v^2$, wherein $\rho$ is air density and v is airflow velocity; and the static pressure is equal to the local atmospheric pressure. As noted above, in the context of the present invention, the airflow velocity v through an air duct is an important indicator of an air filter's efficacy.

In light of the above, it is an object of the present invention to provide a control unit which monitors the efficacy of an air filter in an HVAC system by evaluating the power requirements necessary for the system to maintain a constant airflow velocity through the air filter. Another object of the present invention is to provide a control unit which monitors the efficacy of an air filter in an HVAC system, and signals when the system's power requirements indicate that a replacement of the air filter is appropriate. Still another object of the present invention is to provide a control unit for monitoring the efficacy of an air filter in an HVAC system which is easy to install, is simple to use, and is cost effective.

SUMMARY OF THE INVENTION

For the present invention, a control unit is incorporated into an HVAC system to evaluate the efficacy of an air filter that is positioned in the air ducting of the system. To do this, the control unit compares the velocity of airflow v through the air ducting of the system with the power requirements P of the system.

As a practical matter, the present invention recognizes that, with use, an air filter gets dirty. In this process, as the air filter gets dirty, it increasingly impedes airflow through the filter and the airflow velocity v decreases. An efficient operation of the HVAC system, however, requires a substantially constant airflow velocity v. The question then becomes: when should the air filter be replaced?

Structurally, the control unit of the present invention is incorporated into an air duct of an HVAC system. This air duct defines an airflow channel that extends between an upstream end and a downstream end of the air duct, and it includes a fastener which is mounted at a predetermined location on the air duct for holding the air filter in the airflow channel. An impeller is also provided which is positioned at the downstream end of the air duct. Operationally, the purpose of the impeller is to draw air into and through the airflow channel from the upstream end to the downstream end. In this combination, an important aspect of the present invention is that the control unit is used to vary the power P that is required for operating the impeller.

In addition to the components disclosed above, an airflow velocity sensor is positioned in the airflow channel adjacent the upstream end of the air duct. Its purpose is to measure the velocity v of air entering the airflow channel. Preferably, the airflow velocity sensor is a pitot-static tube of a type well known in the pertinent art and it is positioned in the airflow channel between the fastener and the upstream end of the air duct.

A controller is also provided for the purpose of operating the control unit. In its combination with other components of the present invention, the controller is connected individually to the impeller and to the airflow velocity sensor. Specifically, the controller is connected to the impeller for varying the power requirements P of the impeller. On the other hand, the controller is also connected to the airflow velocity sensor for detecting velocity changes Δv in the airflow velocity v in the air duct of the HVAC system. With these connections, the controller responds to changes Δv in the airflow velocity v to vary and maintain a power P for the impeller that is necessary to minimize Δv. Thus, the overall purpose of the controller is to maintain a constant velocity v for airflow into and through the air channel of an air duct.

To begin an operation of the present invention, the controller is initially set to drive the impeller at a pre-selected power $P_{base}$. Specifically, $P_{base}$ is the power P that is needed for the impeller to establish a desired velocity v for air entering the airflow channel of an air duct. As intended for the present invention, $P_{base}$ is selected and v is established when a fresh, unused air filter is first held in the airflow channel. Subsequently, after $P_{base}$ has been selected, the controller will vary power for the impeller, as needed, to maintain a constant airflow velocity v in the airflow channel. There is, however, a limiting, predetermined maximum power for driving the impeller, $P_{max}$. As a practical matter, $P_{max}$ will depend on the operational capabilities of the impeller. Accordingly, for a normal operation, P will be less than $P_{max}$. However, whenever $P_{max}$ is required, the controller can be programmed to provide a signal, $P_{signal}$, which indicates that the air filter needs to be replaced.

As an additional feature, the present invention envisions the incorporation of a multi-panel air filter into the HVAC system. If incorporated, the multi-panel air filter will sequentially provide separate panels (i.e. sections) of air filter material. Typically, such an air filter will include a supply roll having an n number of contiguous panels (sections) of filter material, wherein each panel is dimensioned to individually cover the cross-section area of the air duct. Such a multi-panel air filter will also typically include a take-up roll, and a motor for periodically rotating the take-up roll to recover a panel of used filter material from the air duct onto the take-up roll. For the multi-panel air filter, an advancement of filter material panels will occur each time the impeller requires $P_{max}$ from the controller. In this case, for an air filter having an n number of panels, the controller will provide a signal, $P_{signal}$, for changing the supply and take up rolls only when the power $P_{max}$ has been required the n number of times, i.e. $P_{signal}$ will occur when P is equal to $P_{max(n)}$.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
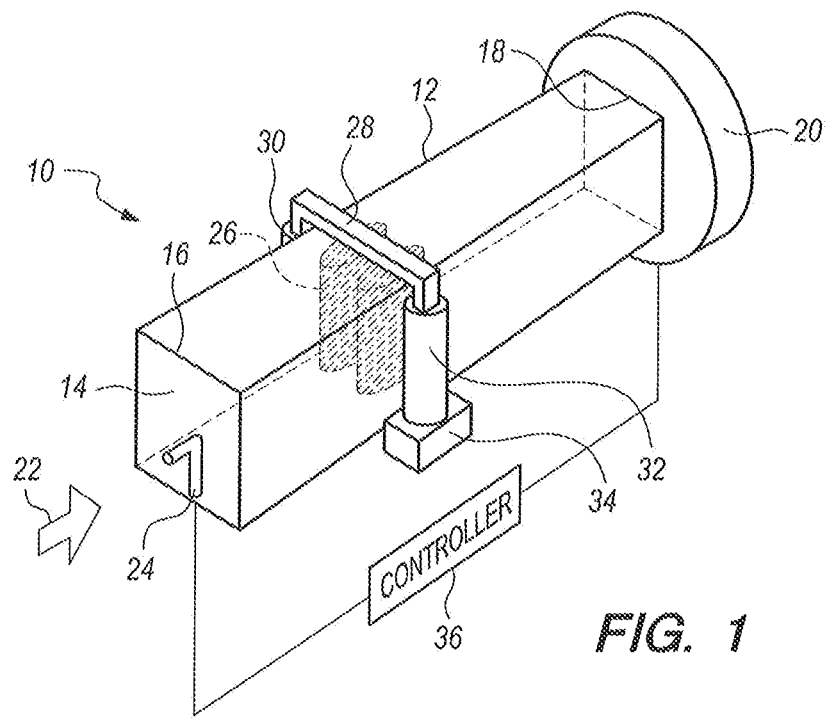
FIG. 1 is a perspective view of components, in combination, for an air filter control unit in accordance with the present invention, wherein the control unit is shown incorporated into the air ducting of an HVAC system with portions shown in phantom for clarity.

Referring initially to FIG. 1, a control unit for an airflow velocity v is shown and is generally designated 10. As shown, the control unit 10 includes an air duct 12 from a Heating-Ventilating-Air-Conditioning (HVAC) system which defines an airflow channel 14. In detail, the airflow channel 14 extends through the air duct 12 from an upstream end 16 to a downstream end 18.

Further, as seen in FIG. 1, the control unit 10 includes an impeller 20 which is intended to draw air into the air duct 12, and through the air channel 14 in an airflow direction indicated by the arrow 22. FIG. 1 also shows that an airflow sensor 24 is positioned at the upstream end 16 of the air duct 12 to measure the velocity v of air entering the air duct 12. As intended for the present invention, the airflow sensor 24 is preferably of a type well known in the pertinent art as a pitot-static tube.

Still referring to FIG. 1, it will be seen that an air filter 26 is positioned and held in the airflow channel 14 by a fastener 28. As shown, the filtering material of the air filter 26 is initially provided on a supply roll 30. When used for the present invention, the filtering material is sequentially drawn across the airflow channel 14 and onto a take-up roll 32 by a motor 34 in a predetermined manner. The filtering material collected on the take-up roll 32 is then, eventually, discarded. In particular, an air filter 26 for use with the present invention is preferably of a type that is disclosed and claimed in U.S. application Ser. No. 15/332,901 for an invention entitled "Automatic Air Filter with Enhanced Air Flow Filtering Area", which is assigned to the same assignee as the present invention.

A controller 36 is shown in FIG. 1 to be connected with the impeller 20. In particular, this connection is provided to control the power requirement P of the impeller 20. Also, the controller 36 is shown to be connected with the airflow velocity sensor 24. Specifically, with this connection, the controller 36 is used to monitor the velocity v of air flowing through the air duct 12. With these connections between the controller 36, the airflow sensor 24 and the impeller 20, the control unit 10 is able to monitor v in the airflow channel 14 and determine changes in the velocity Δv that will occur as material in the air filter 26 gets dirty. At the same time, based on Δv, the control unit 10 will increase the power P that is required by the impeller 20 to counter any diminution in v. As indicated above, increases in P can continue until a value $P_{max}$ is reached. At that time, the panel (section) or filter material in the air filter 26 is replaced.

For the operation of a control unit 10 in accordance with the present invention, consider the power requirements P for impeller 20, and the airflow velocity v through the airflow channel 14 in their relationship to each other. In particular, consider these values when an air filter 26 has an n number of panels of filter material. In this case, each panel includes sufficient filter material to extend completely across the airflow channel 14 when it is positioned on the air filter 26 as shown in FIG. 1. The power requirements P and airflow velocity v considerations for such an operation are shown in FIG. 2.

Figure 2:
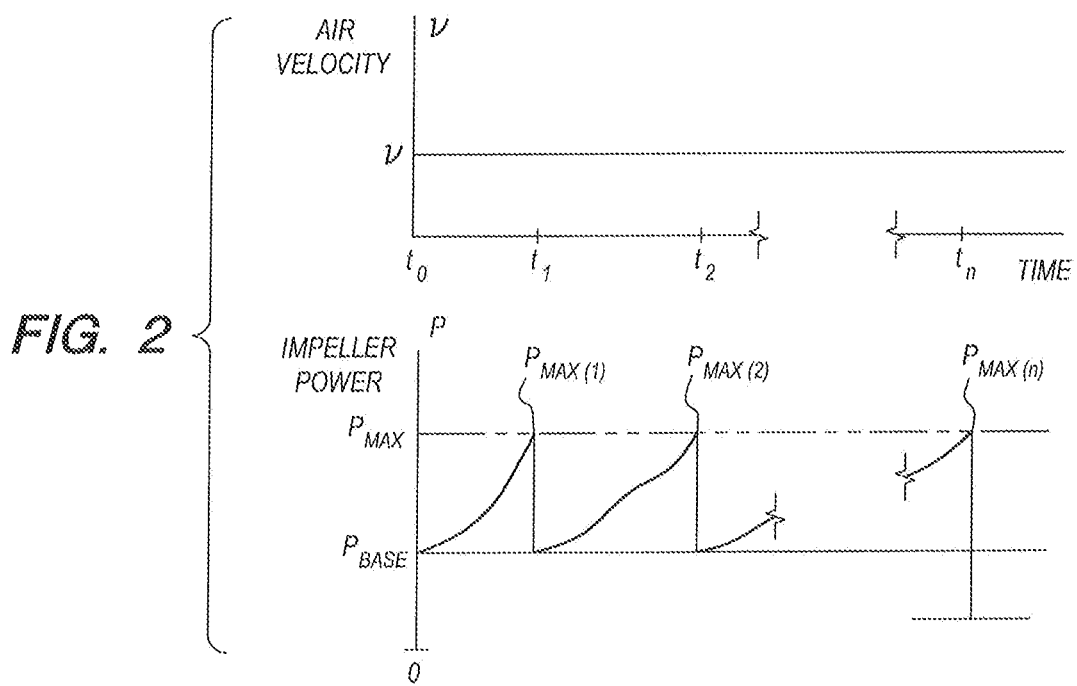
FIG. 2 is a composite time graph of airflow velocity v in the ducting of an HVAC system, and the power requirements P of the HVAC system that are necessary to maintain a constant airflow velocity v during sequential duty cycles of respective air filters.

Referring to FIG. 2, it will be appreciated that an n number of panels of filter material can be sequentially used by an air filter 26 between a start time $t_0$ and a finish time $t_n$ (Note: the time between $t_0$ and $t_n$ will typically be several months, and could possibly be longer than a year). In detail, one panel will be used during a first time interval $t_0$-$t_1$, and another panel will then be used during a subsequent second time interval $t_1$-$t_2$, and so on until the $n^{th}$ time interval $t_{(n-1)}$-$t_n$ has been completed. As intended for the present invention the airflow velocity v will be determined by the operational capabilities of the HVAC system, and will remain substantially constant from $t_0$ to $t_n$.

Although airflow velocity v is to remain substantially constant from $t_0$ to $t_n$, the power requirements P of the impeller 20 that are necessary to maintain a constant airflow velocity v do not. Instead, the power requirements P of the impeller 20 must vary. In particular, as shown in FIG. 2, for each time interval (e.g. $t_0$-$t_1$) the power requirement P for impeller 20 begins with a value $P_{base}$ at $t_0$ and is thereafter gradually increased until a value $P_{max}$ is reached at $t_1$. As noted above, the increasing power requirement for impeller 20 is caused by the accumulation of dirt and particulates in air filter material of the air filter 26, and the consequent resistance to airflow in the airflow channel 14. In the event, whenever the power requirement for the impeller 20 that is necessary to maintain a constant airflow velocity v reaches $P_{max}$, the used panel of air filter material is removed and/or is replaced. A consequence here is that changes of air filter panels are determined by power requirements and not by time considerations. As indicated in FIG. 2, this process continues until all n panels have been used by the air filter 26.

While the particular Airflow Controller for Ducting as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A control unit for monitoring and evaluating the efficacy of an air filter which comprises:
   an air duct, wherein the air duct defines an airflow channel extending between an upstream end and a downstream end;
   a fastener mounted on the air duct for holding the air filter at a location in the airflow channel;
   an impeller positioned at the downstream end of the air duct for drawing air through the airflow channel from the upstream end to the downstream end, wherein a power P for operating the impeller is variable;
   an airflow velocity sensor positioned at the upstream end of the airflow channel to measure an airflow velocity v entering the airflow channel; and
   a controller connected to the impeller for varying the P requirements of the impeller, wherein the controller is connected to the airflow velocity sensor for detecting changes in v ($\Delta v$) and for varying P to minimize $\Delta v$, to maintain a constant velocity v for airflow into the air channel, and wherein a power $P_{base}$ is the power P required for the impeller to establish the velocity v for air entering the airflow channel when a fresh, unused air filter is being held in the airflow channel, and wherein a power $P_{max}$ is a predetermined maximum power limit for an operation of the impeller needed to maintain the constant airflow velocity v when the air filter is held in the airflow channel.

2. The control unit recited in claim 1 wherein the air duct has a cross-section area at the location of the fastener, and the air filter comprises:
   a supply roll, wherein the supply roll includes an n number of contiguous panels of filter material, and each panel is dimensioned to cover the cross-section area of the air duct at the location of the fastener;
   a take-up roll; and
   a motor connected to the take-up roll for periodically rotating the take-up roll to recover a panel of used filter material from the air duct onto the take-up roll, and to replace therewith an unused panel of filter material from the supply roll.

3. The control unit recited in claim 2 wherein the controller activates the motor of the air filter to replace filter material across the air duct whenever P equals $P_{max}$.

4. The control unit recited in claim 3 wherein the controller provides a signal for changing the air filter material in the air filter whenever the P required for operating the impeller satisfies a predefined value $P_{signal}$ equal to $P_{max(n)}$.

5. The control unit recited in claim 1 wherein the airflow velocity sensor is positioned in the airflow channel between the fastener and the upstream end of the air duct.

6. The control unit recited in claim 5 wherein the airflow velocity sensor is a pitot-static tube.

7. The control unit recited in claim 1 wherein the control unit is incorporated into a Heating-Ventilating-Air-Conditioning (HVAC) system.

8. A control unit for monitoring and evaluating the efficacy of an air filter located in an air duct of a Heating-Ventilating-Air-Conditioning (HVAC) system, wherein the air duct defines an airflow channel and has an upstream end and a downstream end, the control unit comprising:
   an impeller positioned at the downstream end of the air duct for drawing air into and through the airflow channel;
   an airflow velocity sensor positioned at the upstream end of the airflow channel to measure an airflow velocity v in the airflow channel; and
   a controller connected to the impeller for varying power requirements P of the impeller, and wherein the controller is connected to the airflow velocity sensor for detecting changes in airflow velocity v ($\Delta v$), and further wherein the controller increases P for the impeller to minimize $\Delta v$ and maintain a constant velocity v for airflow into the air channel, and wherein a power $P_{base}$ is the power P required for the impeller to establish the velocity v for air entering the airflow channel when a fresh, unused air filter is being held in the airflow channel, and wherein a power $P_{max}$ is a predetermined maximum power limit for an operation of the impeller needed to maintain the constant airflow velocity v when the air filter is held in the airflow channel.

9. The control unit recited in claim 8 wherein the controller varies P between $P_{base}$ and $P_{max}$ as needed to maintain the constant airflow velocity v when the air filter is held in the airflow channel.

10. The control unit recited in claim 8 wherein the airflow velocity sensor is positioned in the airflow channel adjacent the upstream end of the air duct.

11. The control unit recited in claim 8 wherein the airflow velocity sensor is a pitot-static tube.

12. The control unit recited in claim 8 wherein the air duct has a cross-section area at the location of the fastener, and the air filter comprises:
   a supply roll, wherein the supply roll includes an n number of contiguous panels of filter material, and each panel is dimensioned to cover the cross-section area of the air duct at the location of the fastener;

a take-up roll; and a motor connected to the take-up roll for periodically rotating the take-up roll to recover a panel of used filter material from the air duct onto the take-up roll, and to replace therewith an unused panel of filter material from the supply roll.

13. The control unit recited in claim 12 wherein the controller activates the motor of the air filter to replace filter material across the air duct whenever P equals $P_{max}$.

14. The control unit recited in claim 13 wherein the controller provides a signal for changing the air filter material in the air filter whenever the P required for operating the impeller satisfies a predefined value $P_{signal}$ equal to $P_{max(n)}$.

15. A method for monitoring and evaluating the efficacy of an air filter when the air filter is located in an air duct of a Heating-Ventilating-Air-Conditioning (HVAC) system, wherein the air duct defines an airflow channel and has an upstream end and a downstream end, the method comprising the steps of:

positioning an impeller at the downstream end of the air duct to draw air into and through the airflow channel;

positioning an airflow velocity sensor at the upstream end of the airflow channel to measure an airflow velocity v in the airflow channel;

detecting changes in airflow velocity v ($\Delta v$); and increasing power requirements P for the impeller based on the detecting step to minimize $\Delta v$ and maintain a constant velocity v for airflow through the air filter in the air channel, and wherein a power $P_{base}$ is the power P required for the impeller to establish the velocity v for air entering the airflow channel when a fresh, unused air filter is being held in the airflow channel, and wherein a power $P_{max}$ is a predetermined maximum power limit for an operation of the impeller needed to maintain the constant airflow velocity v when the air filter is held in the airflow channel.

16. The method recited in claim 15 wherein a power $P_{base}$ is a minimum power P required for the impeller to establish a desired velocity v for air in the airflow channel, and wherein a maximum power $P_{max}$ is a predetermined maximum power limit for an operation of the impeller.

17. The method recited in claim 16 wherein the increasing step varies P between $P_{base}$ and $P_{max}$ as needed to maintain the constant airflow velocity v when the air filter is held in the airflow channel.

* * * * *